(12) United States Patent
Klein et al.

(10) Patent No.: US 8,880,065 B2
(45) Date of Patent: Nov. 4, 2014

(54) TECHNIQUE FOR CELL SIGNATURE DETERMINATION

(75) Inventors: Oliver Klein, Nuremberg (DE); Dietmar Lipka, Berg (DE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 158 days.

(21) Appl. No.: 13/697,991

(22) PCT Filed: Aug. 11, 2010

(86) PCT No.: PCT/EP2010/004921
§ 371 (c)(1),
(2), (4) Date: Dec. 10, 2012

(87) PCT Pub. No.: WO2011/147436
PCT Pub. Date: Dec. 1, 2011

(65) Prior Publication Data
US 2013/0237217 A1    Sep. 12, 2013

(30) Foreign Application Priority Data

May 25, 2010 (EP) .................................. 10005427

(51) Int. Cl.
*H04W 4/00* (2009.01)
*H04W 48/16* (2009.01)
*H04L 27/26* (2006.01)
*H04J 11/00* (2006.01)

(52) U.S. Cl.
CPC ........... *H04W 48/16* (2013.01); *H04L 27/2675* (2013.01); *H04J 11/0086* (2013.01); *H04L 27/2662* (2013.01); *H04L 27/2656* (2013.01); *H04J 11/0076* (2013.01); *H04J 11/0073* (2013.01)
USPC ............ 455/434; 455/423; 455/502; 370/503

(58) Field of Classification Search
None
See application file for complete search history.

(56) References Cited

U.S. PATENT DOCUMENTS

| | | | | |
|---|---|---|---|---|
| 8,031,745 | B2 * | 10/2011 | Onggosanusi et al. | ........ 370/503 |
| 8,588,774 | B2 * | 11/2013 | Klein et al. | .................... 455/434 |
| 2010/0178912 | A1 * | 7/2010 | Gunnarsson et al. | ......... 455/423 |
| 2013/0273912 | A1 * | 10/2013 | Xu et al. | ....................... 455/434 |

FOREIGN PATENT DOCUMENTS

WO    2009039470 A1    3/2009

* cited by examiner

*Primary Examiner* — Erika A Washington
(74) *Attorney, Agent, or Firm* — Coats & Bennett, PLLC

(57) ABSTRACT

A technique for cell signature determination in a cellular communication network is described. A method implementation of this technique comprises the steps of providing a set of cell signature hypotheses (d(n)), each cell signature hypothesis including a first partial hypothesis (d(2n)) and a second partial hypothesis (d(2n+1)), receiving a signal (X(n)) carrying a cell signature, the signal (X(n)) including a first partial signal (X(2n)) and a second partial signal (X(2n+1)), correlating the first partial signal (X(2n)) with each first partial hypothesis (d(2n)) to determine a first correlation result for each cell signature hypothesis, correlating the second partial signal (X(2n+1)) with each second partial hypothesis (d(2n+1)) to determine a second correlation result for each cell signature hypothesis, and determining the cell signature based on the correlation results including discarding a given cell signature hypothesis based on an analysis of a first magnitude of the first correlation result associated with the given cell signature hypothesis and a second magnitude of the second correlation result associated with the given cell signature hypothesis.

19 Claims, 3 Drawing Sheets

US 8,880,065 B2

TECHNIQUE FOR CELL SIGNATURE DETERMINATION

TECHNICAL FIELD

The present disclosure generally relates to cellular communication networks. In particular, a technique for determining cell signatures is presented.

BACKGROUND

Modern networks for mobile communication are organized in cells. For this reason, a cell search procedure will be initiated by a user terminal upon power on or in preparation for a potential handover. In Evolved Universal Terrestrial Radio Access (E-UTRA) networks, the cell search procedure is based on a synchronization process between a user terminal (or User Equipment, UE) and a base station (or eNodeB) of the E-UTRA network potentially serving the user terminal.

The synchronization process in the E-UTRA network involves Primary and Secondary Synchronization Signals (PSSs and SSSs) and provides frequency and symbol synchronization, frame synchronization and cell signature detection. The PSS and SSS jointly span a cell signature space. Each SSS additionally carries frame timing information indicative of whether the particular SSS is transmitted in sub-frame 0 or subframe 5. The frame timing information is exploited for frame synchronization. Still further, the SSS is indicative of a particular Cyclic Prefix (CP) configuration employed by the respective eNodeB.

According to Section 6.11 of 3$^{rd}$ Generation Partnership Project (3GPP) Technical Specification (TS) 36.211 V.8.9.0 (2010-01), the cell signatures, also called Physical Cell Identities (PCIs), in an E-UTRA network are organized in 168 unique cell-identity groups (represented by an identifier $N_{ID}^{(1)}=0,\ldots,167$), each cell-identity group comprising three cell-identities (represented by an identifier $N_{ID}^{(2)}=0, 1, 2$), which amounts to a total of 504 PCIs (or cell IDs) $N^{CELL}_{ID}=3N_{ID}^{(1)}N_{ID}^{(2)}$ addressable by the pair of identifiers $N_{ID}^{(1)}$ and $N_{ID}^{(2)}$.

Initially, the cell-identity identifier $N_{ID}^{(2)}$ is detected in a received PSS. Then, for detection of the associated cell-identity group identifier $N_{ID}^{(1)}$, an analysis of a received SSS $X_{SSS}$ is required. The analysis involves a correlation of the received SSS $X_{SSS}$ with SSS replicas indicative of all possible cell identity group identifier $N_{ID}^{(1)}$ hypotheses.

The correlation may be implemented according to $$c(N_{ID}^{(1)}, s_{pos}, cp_{type}) = \sum_{n=0}^{61} X_{SSS}^{cp_{type}}(n) \cdot d_{N_{ID}^{(1)}, s_{pos}}^{N_{ID}^{(2)}}(n), \quad \text{(Eq. 1)}$$

to assess a hypothesized set of communication parameters including the cell-identity group identifier $N_{ID}^{(1)}$, two possible sub-frame positions $s_{pos}$ (at 0 ms or 5 ms) and two possible cyclic prefix types $cp_{type}$ (normal or extended). Here, the received SSS assuming a cyclic prefix type $cp_{type}$ to be tested is denoted by $X_{SSS}^{cp_{type}}$. The SSS replica (or hypothesis signal) is denoted by $$d_{N_{ID}^{(1)}, s_{pos}}^{N_{ID}^{(2)}}$$

for a given cell-identity group identifier $N_{ID}^{(1)}$ hypothesis, a given sub-frame position hypothesis $s_{pos}$ and the cell-identity identifier $N_{ID}^{(2)}$ determined from the PSS (as SSS generation involves scrambling of the cell-identity group identifier $N_{ID}^{(1)}$ with the associated cell-identity identifier $N_{ID}^{(2)}$).

The hypothesis signal $$d_{N_{ID}^{(1)}, s_{pos}}^{N_{ID}^{(2)}}$$

is a sequence of elements in $\{-1, +1\}$, for which reason products in Eq. 1 between elements of the received SSS $X_{SSS}^{cp_{type}}(n)$ and the hypothesis signal $$d_{N_{ID}^{(1)}, s_{pos}}^{N_{ID}^{(2)}}$$

(n) are often not implemented by multiplication steps, but as fast sign changes. In the absence of multiplications steps, the computational complexity depends on the number of involved addition steps.

Computation of the correlations requires considerable hardware resources as the synchronization signals occur twice per 10 ms radio frame, and there are numerous combinations of communication parameters to be evaluated. The computational complexity of the implementation according to Eq. 1 requires 2×2×168×62=41.664 addition steps for evaluating each combination of the two cyclic prefix types ($cp_{type}=0, 1$), the two sub-frame timings ($s_{pos}=0, 1$), and the 168 possible cell-identity groups ($N_{ID}^{(1)}$), each evaluation involving 61 additions for correlating corresponding sequences of length I=62. After the correlations have been fully computed, the locations of correlation peaks that exceed a predefined threshold (and their magnitudes) are returned as cell-identity group candidates.

In E-UTRA networks, two different duplex modes are defined. Time Division Duplex (TDD) networks are operated synchronously, which means that the respective cells are aligned with respect to their frame timing. This also implies that synchronization signals from different cells may overlap at least partially in time. Frequency Division Duplex (FDD) networks operate either synchronously or asynchronously. It has been found that even in an asynchronous mode of operation, an at least partial overlap of synchronization signals from different cells may occur.

As a consequence of overlapping synchronization signals from different cells, the cell search procedure can be impaired. It has been observed in E-UTRA networks that cell search procedures become particularly error-prone in case of overlapping synchronization signals from "competing" cells utilizing the same PSS version (i.e., utilizing the same cell-identity identifier $N_{ID}^{(2)}$).

One of the problems that impair the cell search procedure in the presence of overlapping synchronization signals, and in other cases, are correlation peaks that indicate the presence of "phantom" cells but are in reality only correlation artefacts. To reduce the detection probability of phantom cells a suitable threshold setting may be chosen for the proper identification of correlation peaks from a "valid" cell. However, since peaks for phantom cells may appear 3 to 4 dB below a peak of the corresponding valid cell, which is the same level as for potential neighbour cells to be detected, it is in practice difficult to find a suitable threshold setting: if the threshold setting is too high, valid cells (and in particular neighbor cells) may not be detected, while phantom cells will not be removed in case the threshold setting is too low.

In the presence of phantom cells, it may take more time to detect weaker cells potentially hidden behind a stronger cell. Under unfavourable conditions, the weaker cells may not be detectable at all. Additionally, processing power and battery resources will be wasted due to the extended cell search procedure.

SUMMARY

There is a need for a technique that permits a reliable cell signature determination when two or more signals carrying cell signatures overlap in time, and in other situations. In particular, there is a need to overcome one ore more of the above problems associated with phantom cells.

According to a first aspect, a method of determining a cell signature in a cellular communication network is provided, wherein the method comprises providing a set of cell signature hypotheses, each cell signature hypothesis including a first partial hypothesis and a second partial hypothesis, receiving a signal carrying a cell signature, the signal including a first partial signal and a second partial signal, correlating the first partial signal with each first partial hypothesis to determine a first correlation result for each cell signature hypothesis, correlating the second partial signal with each second partial hypothesis to determine a second correlation result for each cell signature hypothesis, and determining the cell signature based on the correlation results including discarding a given cell signature hypothesis based on an analysis of a first magnitude of the first correlation result associated with the given cell signature hypothesis and a second magnitude of the second correlation result associated with the cell signature hypothesis.

As understood herein, a cell signature may be any item of information which at least in principle permits to distinguish two cells, or a portion of such an item of information. As an example, the cell signature may comprise a PCI or only a PCI portion used for spanning a PCI space. Such a PCI portion may, for example, take the form of a cell-identity identifier or a cell-identity group identifier. It should be noted that the cell signature need not be unique. It should also be noted that a single cell may have more than one cell signature.

The cell signature hypotheses may be known a priori to an apparatus executing the method. Therefore, the cell signature hypotheses may be pre-stored in a local memory of the apparatus. As a non-limiting example, in an E-UTRA scenario the cell signature hypotheses may correspond to the 504 PCIs, the 168 cell-identity group identifiers and/or the three cell-identity identifiers that may potentially be assigned in an E-UTRA network. Moreover, the cell signature hypotheses may correspond to SSS replicas (as for use in an "exhaustive" search).

The analysis for discarding the given cell signature hypothesis may be based on the a priori knowledge that in case the first magnitude substantially differs from the second magnitude, an undesired correlation artefact potentially indicating a "phantom" cell has been introduced, and that the given cell signature hypothesis can thus be discarded. Based on this a priori knowledge, various mathematical expressions may be defined that can be evaluated either singly or in combination to determine whether or not a specific cell signature hypothesis is to be discarded or, in the alternative, processed further.

In one implementation, the analysis for discarding the given cell signature hypothesis may comprise analyzing at least one of a difference and a ratio between the first magnitude and the second magnitude of the given cell signature hypothesis.

Additionally, or in the alternative, the analysis for discarding the given cell signature candidate may comprise subjecting at least one of the first magnitude, the second magnitude and a third magnitude, or at least one parameter derived from one or more of the first magnitude, the second magnitude and the third magnitude, to a threshold decision. The third magnitude may be defined as the magnitude of a sum of the first correlation result and the second correlation result associated with the given cell signature.

For each of the first magnitude, the second magnitude and the third magnitude a separate threshold may be defined. In another scenario, the same threshold is applied with respect to the first magnitude and the second magnitude. The given cell signature hypothesis may be discarded if at least one of the first magnitude, the second magnitude and the third magnitude is below the associated threshold.

Alternatively, or in addition, the given cell signature hypothesis may be discarded if the third magnitude is above a first threshold and a fourth magnitude of the difference between the first magnitude and the second magnitude is above a second threshold. In such a scenario, the step of determining the cell signature may comprise an initial step of determining a set of one or more cell signature candidates based on cell signature hypotheses for which the third magnitude is above the first threshold. In a second step, those cell signature candidates from the set of cell signature candidates for which the fourth magnitude is above the second threshold may be discarded.

According to a still further implementation, the given cell signature hypothesis may be discarded if the ratio between the first magnitude and the second magnitude is either above a third threshold or below a fourth threshold. In other words, the given cell signature hypothesis may only be processed further in case the ratio between the first magnitude and the second magnitude falls within a predefined range.

It will be appreciated that in addition to the mathematical expressions presented above, other mathematical expressions may be derived to remove correlation results potentially indicative of phantom cells from further processing.

Any of the thresholds underlying the threshold decisions performed in context with the analysis for discarding the given cell signature candidate may be set relative to a noise level of a transmission channel for the received signal (and may, optionally, be dynamically changed responsive to noise level changes). Any of the thresholds may additionally or alternatively be set dependent on one or more other parameters.

The first partial signal and the second partial signal may be orthogonal to each other. This orthogonality may result from the first partial signal being transmitted on a first set of sub-carriers and the second partial signal being transmitted on a second set of sub-carriers disjunctive from the first set of sub-carriers. As an example, the first set of sub-carriers may relate to even numbered sub-carriers, and the second set of sub-carriers may relate to odd numbered sub-carriers. As regards the cell signature hypotheses, the first partial hypothesis may relate to even numbered signature elements, and the second partial hypothesis may relate to odd numbered signature elements. The signature elements may in total define a sequence corresponding to a specific cell signature hypothesis.

In an E-UTRA or similar implementation the received signal may be a secondary synchronization signal carrying a cell-identity group identifier scrambled with a cell-identity identifier. The cell identity identifier may have been determined earlier based on a previously received primary synchronization signal. In such a case, the cell signature hypotheses may relate to hypotheses regarding at least the cell-identity group identifier. In one configuration, the cell signature hypotheses may additionally relate to at least one of frame timing hypotheses and cyclic prefix configuration hypotheses. In such a configuration, at least one of the frame timing and the cyclic prefix configuration may be determined concurrently with the cell signature (e.g., with the cell-identity group identifier).

The technique presented herein may be realized in the form of software, in the form of hardware or using a combined software/hardware approach. As regards a software aspect, a computer program product comprising program code portions for performing the steps presented herein when the computer program product is run on one or more computing devices is provided. The computer program product may be stored on a computer-readable recording medium such as a memory chip, a CD-ROM, a DVD-ROM, a hard disk and so on. Alternatively, the computer program product may be provided for download via a communication network.

As for a hardware aspect, an apparatus for determining a cell signature in a cellular communication network is provided. The apparatus comprises a component adapted to provide a set of cell signature hypotheses, each cell signature hypothesis including a first partial hypothesis and a second partial hypothesis, an interface adapted to receive a signal carrying a cell signature, the signal including a first partial signal and a second partial signal, a correlator adapted to correlate the first partial signal with each first partial hypothesis to determine a first correlation result for each cell signature hypothesis, and to correlate the second partial signal with each second partial hypothesis to determine a second correlation result for each cell signature hypothesis, and a processor adapted to determine the cell signature based on the correlation results, wherein the determination includes discarding a given cell signature hypothesis based on an analysis of a first magnitude of the first correlation result associated with the given cell signature hypothesis and a second magnitude of the second correlation result associated with the given cell signature hypothesis.

The processor may also incorporate the correlator. Moreover, the processor may be adapted to perform the analysis for discarding the given cell signature hypothesis based on the a priori knowledge that in case the first magnitude substantially differs from the second magnitude, an undesired correlation artefact has been introduced, and that the given cell signature hypothesis has to be discarded.

The apparatus may be incorporated in a transceiver of a mobile terminal such as a mobile telephone, smart phone, network or data card, notebook computer, and so on. The mobile terminal may conform to the 3GPP Long Term Evolution (LTE) specification.

BRIEF DESCRIPTION OF THE DRAWINGS

Further aspects and advantages of the technique presented herein will become apparent from the following embodiments in conjunction with the drawings, wherein.

DETAILED DESCRIPTION

In the following description of preferred embodiments, for purposes of explanation and not limitation, specific details are set forth (such as particular communication standards and signature formats) in order to provide a thorough understanding of the technique presented herein. It will be apparent to one skilled in the art that the present technique may be practised in other embodiments that depart from these specific details.

For example, while the embodiments will primarily be described in the context of the fourth generation mobile communication standard of Long Term Evolution (LTE) and corresponding E-UTRA networks, it will be evident that the technique presented herein can also be practised in connection with other communication standards and access networks.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP), general purpose computer or any other computing device. It will also be appreciated that when the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

When searching for E-UTRA cells with different cell-identity group identifiers $N_{ID}^{(1)} \in \{0, 1, \ldots, 167\}$, received at unequal strengths and whose SSS overlap at least partially, i.e., are received at almost the same time, SSS detection may result in erroneous cell-identity group detection for the weaker cell in case both cells have the same cell-identity group identifier $N_{ID}^{(2)} \in \{0, 1, 2\}$. Investigations have shown that instead of detecting the cell-identity group identifier $N_{ID}^{(1)}$ of the weaker cell, often one or more cell-identity group identifiers of phantom cells related to the stronger cell are detected. In certain cases it may even be difficult to detect the cell-identity group identifier $N_{ID}^{(1)}$ of a strong cell due to the presence of phantom cells.

It has been found that phantom cells are detected as a consequence of correlation artefacts (or "correlation spuriouses") from the signal of the stronger cell (i.e., in the present E-UTRA embodiment, from its SSS carrying a particular cell-identity group identifier $N_{ID}^{(1)}$) in the correlation results searched for the weaker cell. The correlation artefacts thus simulate the presence of phantom cells that do not exist in reality. The artefacts not only impair the cell search procedure and associated measurements in relation to (weaker) neighbor cells, but sometimes also for a strong cell.

Figure 1:
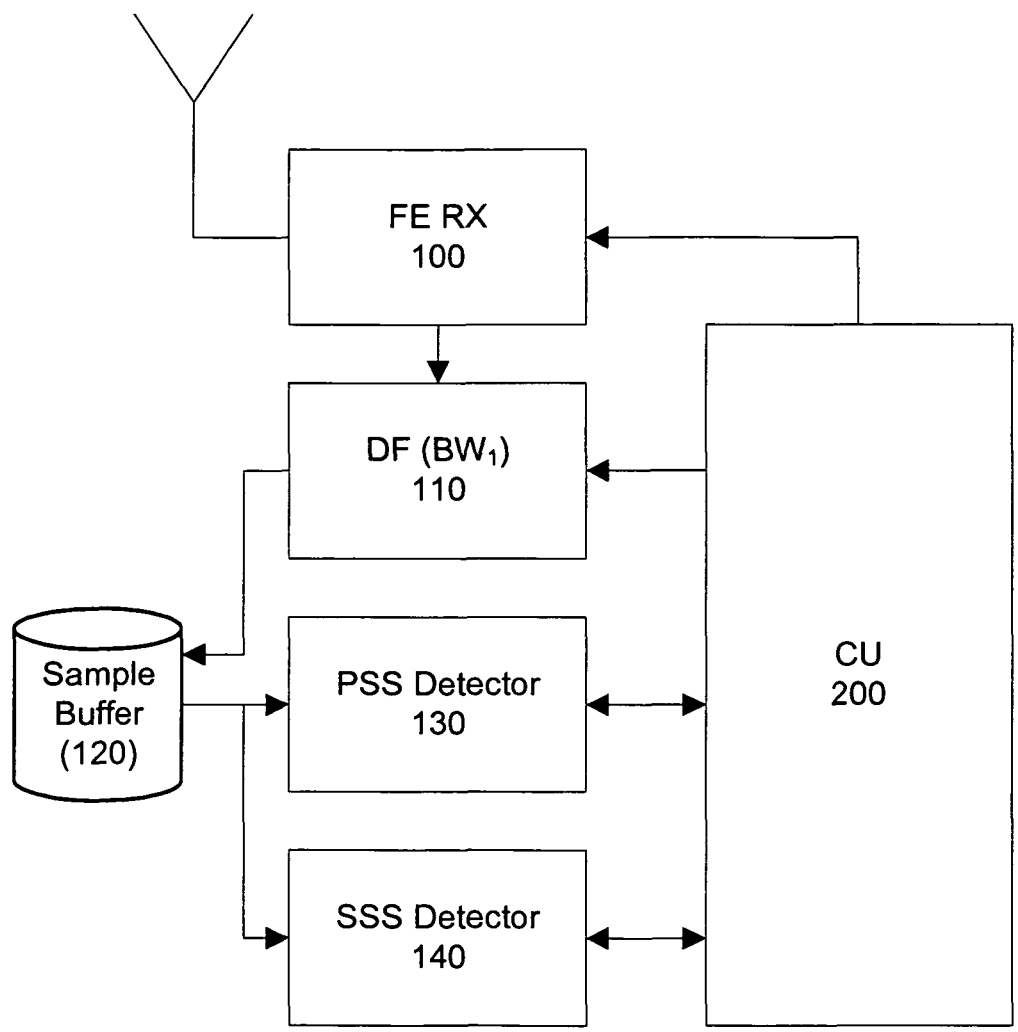
FIG. 1 schematically illustrates a receiver stage embodiment.

FIG. 1 illustrates an embodiment of a receiver stage 10 of a mobile terminal configured for cell signature determination in an E-UTRA network. The mobile terminal may take the form of a mobile telephone or of data card connectable to a notebook or stationary computer.

Cell signature determination by the receiver stage 10 can be performed in the context of connected mode mobility within E-UTRA. Connected mode mobility is supported by measurements carried out by the mobile terminal and then reported to the E-UTRA network (e.g., to a serving eNodeB).

The network utilizes the measurement reports from the user terminal when deciding whether to handover the user terminal to another cell (i.e., to another eNodeB), but also for other purposes such as network optimization and cell planning. The measurements carried out by the mobile terminal in the context of connected mode mobility include detection of neighbouring cells (cell search) and signal strength estimation (e.g., RSRP estimation). The core requirements defined in 3GPP TS 36.133, V8.8.0 stipulate that the user terminal shall be able to detect and report to the network intra-frequency neighbouring cells within a predefined time span.

The receiver stage 10 is configured to perform PSS and SSS detection as will now be described in more detail.

As illustrated in FIG. 1, the receiver stage 10 comprises a conventional receiver front-end 100 coupled to one or more antennas. The front-end 100 is configured to amplify one or more signals received from one or more eNodeBs, with each signal carrying a PSS and an SSS.

The receiver stage 10 further comprises a digital filter 110 configured to filter the received signal that has been amplified by the receiver front-end 100. The digital filter 110 has a predefined bandwidth BW that suppresses sub-carriers outside the central sub-carriers, as the SSS is mapped onto the central 62 Resource Elements (REs). Optionally, the received signal may also be down-sampled.

A sample buffer 120 is provided to store the filtered (and optionally down-sampled) signal samples in the form of Orthogonal Frequency Division Multiplexing (OFDM) symbols after conventional symbol synchronization (including cell-identity identifier $N_{ID}^{(2)}$ detection) by a PSS detector 130. SSS detection is then carried out by an SSS detector 140 based on the buffered OFDM symbols and under control of a control unit 200.

Figure 2:
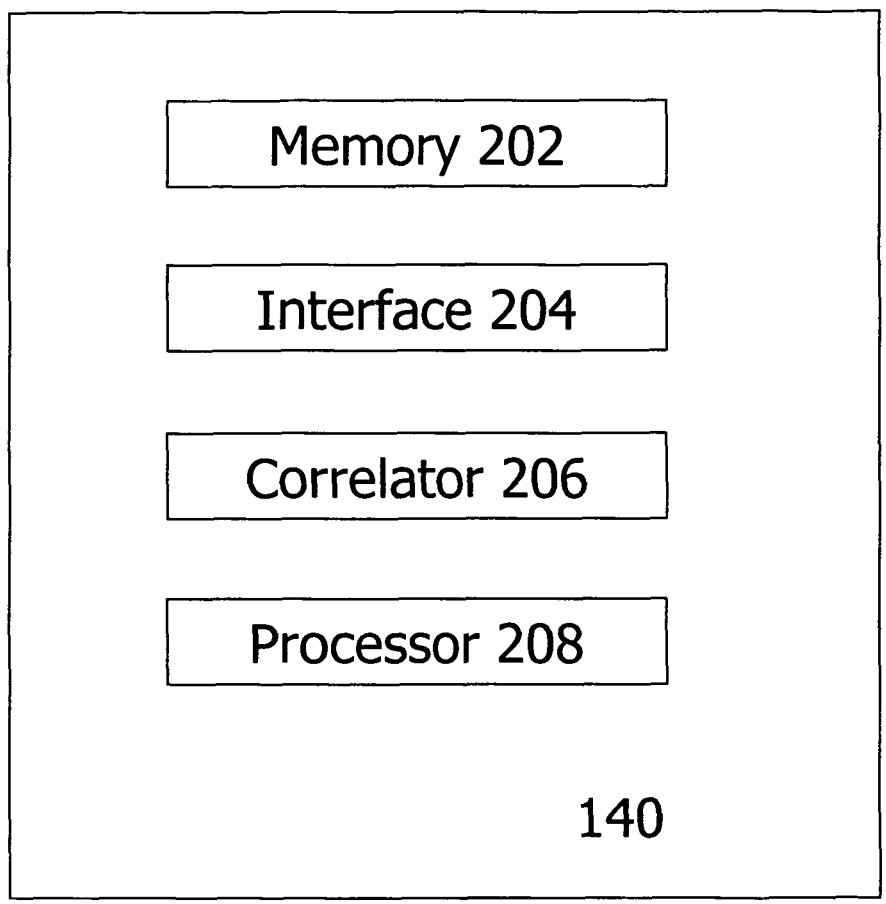
FIG. 2 schematically illustrates an exemplary configuration of an SSS detector of the receiver stage embodiment of FIG. 1.

The configuration of the SSS detector 140 is illustrated in more detail in FIG. 2. As becomes apparent from FIG. 2, the SSS detector 140 comprises a memory 202, an interface 204, a correlator 206, as well as a processor 208. As an exemplary realization, the correlator 206 may take the form of a matched filter, in which case the correlation results correspond to filter outputs. In one implementation the correlator 206 is realized by the processor 208.

Figure 3:
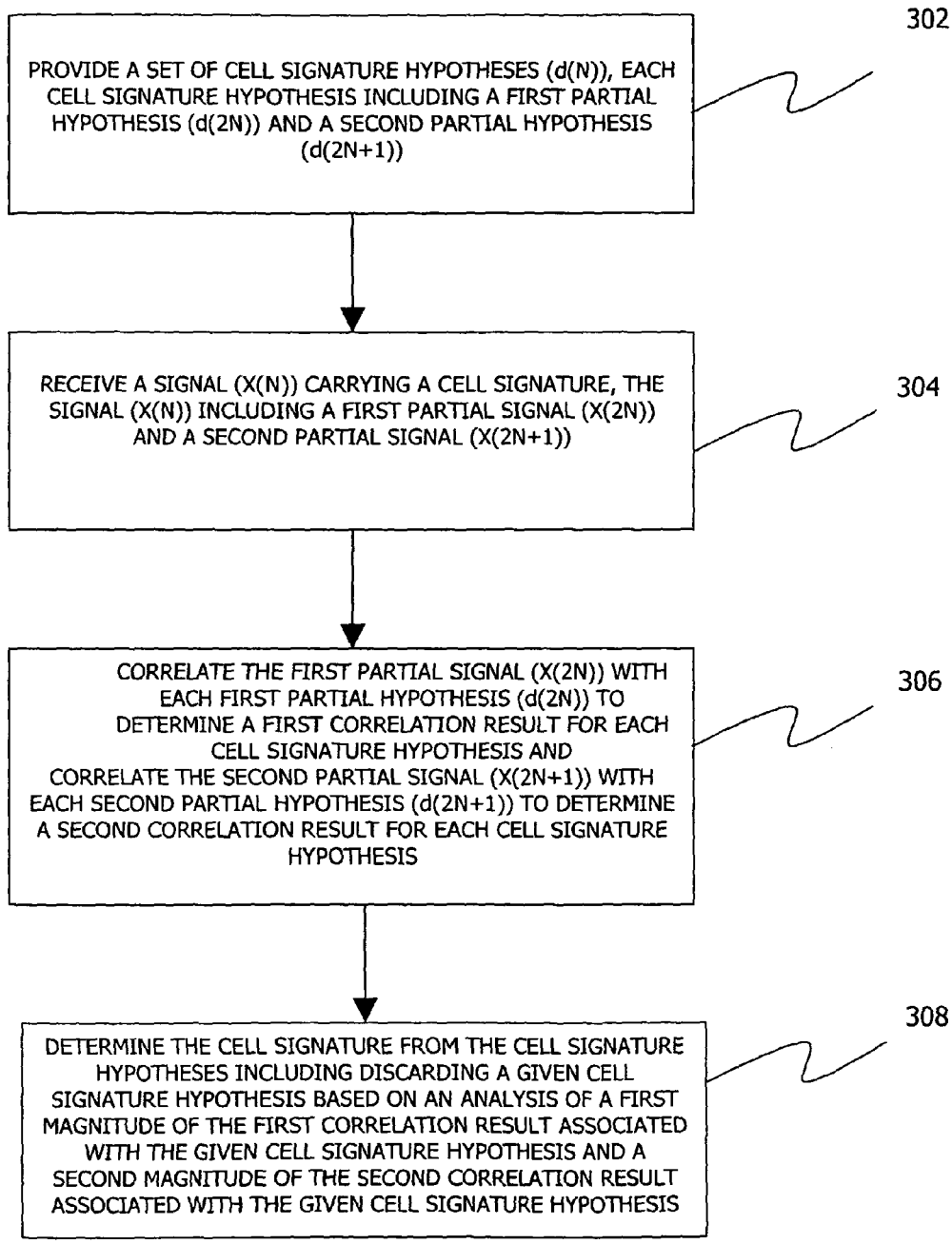
FIG. 3 shows a flow diagram schematically illustrating a method embodiment for cell signature determination.

The operation of the receiver stage 10, and in particular of the SSS detector 140, will now be described in more detail with reference to the exemplary flow diagram 300 of FIG. 3. The flow diagram 300 illustrates a method embodiment for cell signature determination.

The memory 202 stores a predefined set of cell signature hypothesis, or hypothesis signals, a priori known to the user terminal (provision step 302). Each hypothesis signal relates to one of the cell signatures ("cell signature hypotheses") that may be assigned in the E-UTRA network. In the present embodiment, one dedicated hypothesis signal is provided for each of the 168 cell-identity group identifiers $N_{ID}^{(1)}$ (or, which is equivalent, for each shift pair $(m_0, m_1)$ as defined in Table 6.11.2.1-1 of 3GPP TS 36.211, V8.9.0) regarding a given sub-frame position hypothesis $s_{pos}$ and a given cell-identity identifier $N_{ID}^{(2)}$.

As has already been explained above, each hypothesis signal comprises a sequence of elements in $\{-1, +1\}$. Each sequence can thus be divided in even numbered signature elements $$d_{N_{ID}^{(1)}, s_{pos}}^{N_{ID}^{(2)}}$$

(2n) (corresponding to a first partial hypothesis regarding a given cell-identity group identifiers $N_{ID}^{(1)}$, a given sub-frame position hypothesis $s_{pos}$ and a given cell-identity identifier $N_{ID}^{(2)}$) and odd numbered signature elements $$d_{N_{ID}^{(1)}, s_{pos}}^{N_{ID}^{(2)}}$$

(2n+1) (corresponding to a second partial hypothesis regarding a given cell-identity group identifiers $N_{ID}^{(1)}$, a given sub-frame position hypothesis $s_{pos}$ and a given cell-identity identifier $N_{ID}^{(2)}$).

It will be assumed in the following that a potential cell with a specific cell-identity identifier $N_{ID}^{(2)}$ has already been detected by the PSS detector 130 based on the signal samples stored in the sample buffer 120. To this end, the PSS detector 130 performs correlations using matched filtering on the basis of the three cell-identities that may potentially be assigned. The matched filtering is performed over at least 5 ms of received samples. Correlation peaks in the filter output reveal one or more cell-identity candidates, that may be processed further to determine the cell-identity identifier $N_{ID}^{(2)}$ actually signaled. The PSS also serves as a basis for an initial frequency offset estimation.

Upon having identified the cell-identity identifier $N_{ID}^{(2)}$ by the PSS detector 130, the next step is SSS detection by the SSS detector 140 in cooperation with the control unit 200. In the present LTE embodiment, SSS detection yields frame timing information, cell-identity group information as well as CP configuration information. SSS detection by the SSS detector 140 generally starts once a potential cell with an associated cell-identity has been detected by the PSS detector 130 as discussed above. Alternatively, SSS detection may also start if the potential cell with a given cell-identity has been hypothesized to be at a particular frame timing (hidden cell search).

In an initial step, SSS detection comprises the calculation of channel estimates based on the PSS, and the application of the channel estimates to the signal samples in the sample buffer 120 which are hypothesized to carry the SSS. This channel equalization compensates for linear phase and transmission channel influences. In case the receiver stage 10 comprises more than one receiver branch, the signal samples received via different receiver branches are combined.

In a next step the SSS detector 140 retrieves (i.e., receives) via the interface 204 the equalized OFDM symbols from the sample buffer 120 for SSS detection (receiving step 304). The SSS corresponding to the buffered OFDM symbols was received on orthogonal sub-carriers (see Section 6.11.2.2 of 3GGP TS 36.211). It is therefore possible to interpret the received SSS $X_{SSS}(n)$ as being composed of two partial signals $X_{SSS}(2n)$ and $X_{SSS}(2n+1)$.

In a further step 306, the correlator 206 correlates the OFDM symbols received via the interface 206 with the hypothesis signals read from the memory 202. The correlation operations are performed such that each individual correlation yields two partial results as will now be described in more detail.

Since each SSS is an interleaved concatenation of two length-31 binary sequences in the frequency domain, the correlation $$c(N_{ID}^{(1)}, s_{pos}, cp_{type}) = \sum_{n=0}^{61} X_{SSS}^{cp_{type}}(n) \cdot d_{N_{ID}^{(1)}, s_{pos}, N_{ID}^{(2)}}(n)$$

can be subdivided into two partial correlations described by $$c(N_{ID}^{(1)}, s_{pos}, cp_{type}) = \sum_{n=0}^{30} X_{SSS}^{cp_{type}}(2n) \cdot d_{N_{ID}^{(1)}, s_{pos}, N_{ID}^{(2)}}(2n) +$$

$$\sum_{n=0}^{30} X_{SSS}^{cp_{type}}(2n+1) \cdot d_{N_{ID}^{(1)}, s_{pos}, N_{ID}^{(2)}}(2n+1).$$

In accordance with Section 6.11 of 3GGP TS 36.211, the first partial hypothesis corresponding to the even numbered signature elements and the second partial hypothesis corresponding to the odd numbered signature elements are defined as $$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_1^{(m_1)}(n)c_0(n)z_1^{(m_1)}(n) & \text{in subframe 5} \end{cases}$$

The correlation equation from above can be rewritten as $$c(N_{ID}^{(1)}, s_{pos}, cp_{type}) = c_1(N_{ID}^{(1)}, s_{pos}, cp_{type}) + c_2(N_{ID}^{(1)}, s_{pos}, cp_{type}),$$

where $$c_1(N_{ID}^{(1)}, s_{pos}, cp_{type}) = \sum_{n=0}^{30} X_{SSS}^{cp_{type}}(2n) \cdot d_{N_{ID}^{(1)}, s_{pos}, N_{ID}^{(2)}}(2n)$$

$$c_2(N_{ID}^{(1)}, s_{pos}, cp_{type}) = \sum_{n=0}^{30} X_{SSS}^{cp_{type}}(2n+1) \cdot d_{N_{ID}^{(1)}, s_{pos}, N_{ID}^{(2)}}(2n+1).$$

The correlator 206 is configured to individually determine the above partial correlation results $c_1(N_{ID}^{(1)}, s_{pos}, cp_{type})$ and $c_2(N_{ID}^{(1)}, s_{pos}, cp_{type})$. A possible candidate for a set of communication parameters $(N_{ID}^{(1)}, s_{pos}, cp_{type})$, including a candidate for a cell-identity group identifier $N_{ID}^{(1)}$, has been found if the corresponding correlation magnitude of $c(N_{ID}^{(1)}, s_{pos}, cp_{type})$ exceeds a predefined threshold $C_{th}$ $$|c(N_{ID}^{(1)}, s_{pos}, cp_{type})| > C_{th}.$$

As has been explained above, phantom cells are only 3 to 4 dB weaker than the corresponding valid cell. In scenarios with a low Signal-to-Noise Ratio (SNR) it is therefore almost impossible to separate phantom cells from valid cells based on a threshold decision solely based on $C_{th}$. If $C_{th}$ is set too high, there is a considerable likelihood that a valid cell cannot be detected. On the other hand, if $C_{th}$ is set too low, then not all phantom cells will be removed.

However, an analysis of $c_1(N_{ID}^{(1)}, s_{pos}, cp_{type})$ and $c_2(N_{ID}^{(1)}, s_{pos}, cp_{type})$ reveals a different behavior of the two partial correlations in case of a valid cell on the one hand and a phantom cell on the other. The most straightforward difference is the fact that in case the cell is valid, the two partial correlation magnitudes are about equal, while in case of a phantom cell one of the two is almost zero (this also explains why the correlation magnitude difference between a valid cell and phantom cell is around 3 dB).

This a priori knowledge leads to the following mathematical expression for phantom cell detection (i.e., for discarding a given signature hypothesis in relation to $N_{ID}^{(2)}$ as belonging to a phantom cell) in a cell signature determination step 308 performed by the processor 208 based on the output of the correlator 206: a given hypothesis becomes a candidate to be processed further only if the corresponding partial correlation magnitudes exceed corresponding thresholds $C_{th,1}$ and $C_{th,2}$ $$|c_1(N_{ID}^{(1)}, s_{pos}, cp_{type})| > C_{th,1} \text{ AND } |c_2(N_{ID}^{(1)}, s_{pos}, cp_{type})| > C_{th,2}.$$

The thresholds $C_{th,1}$ and $C_{th,2}$ may be set equal. They can be set absolutely or relative to the noise level of the transmission channel via which the SSS has been received.

In one example, a threshold decision based on $C_{th}$, which is not set too high, is performed initially to detect a candidate set of communication parameters $(N_{ID}^{(1)}, s_{pos}, cp_{type})$. Then, in a second round, such candidates are eliminated from the candidate set that do not pass a subsequent threshold decision based on the thresholds $C_{th,1}$ and $C_{th,2}$.

It is also possible to use the threshold $C_{th}$ in combination with another threshold indicative of a maximum difference $\Delta_c$ between the two partial correlation magnitudes $$|c(N_{ID}^{(1)}, s_{pos}, cp_{type})| > C_{th} \text{ AND } |c_1(N_{ID}^{(1)}, s_{pos}, cp_{type}) - c_2(N_{ID}^{(1)}, s_{pos}, cp_{type})| < \Delta_c.$$

According to a still further mathematical expression for discarding hypotheses likely to be affected by correlation artefacts, a non-coherent condition can be defined according to $$|c_1(N_{ID}^{(1)}, s_{pos}, cp_{type})| < \alpha \cdot |c_2(N_{ID}^{(1)}, s_{pos}, cp_{type})| \text{ AND}$$

$$|c_2(N_{ID}^{(1)}, s_{pos}, cp_{type})| < \alpha \cdot |c_1(N_{ID}^{(1)}, s_{pos}, cp_{type})|$$

where $\alpha > 1$, for example 2.

Based on the exemplary mathematical expressions discussed above, the processor 208 can safely discard hypotheses in relation to a given communication parameter set $(N_{ID}^{(1)}, s_{pos}, cp_{type})$ for which the correlation result is likely to be associated with a phantom cell. This means that only the hypotheses that have not been discarded need to be processed further. The control unit 200 receives from the processor 208 one or more candidates for promising communication parameter sets (excluding the discarded hypotheses). The control unit 200 then starts validating the one or more candidates (e.g., by RSRP measurements).

Cell-identity group determination by the processor 208 can be refined by exploiting the a priori knowledge that the particular partial correlation which becomes almost zero for each phantom cell can be predicted beforehand. It is a priori known that each cell ID has a deterministic set of phantom cells, which has one partial correlation of about zero. For example, a cell-identity group identifier $N_{ID}^{(1)}$ can be mapped with a first partial sequence $d(2n)^{(m0)}$ and with a second partial sequence $d(2n+1)^{(m1)}$, wherein the partial sequences depend on the value of the indices m0 and m1, respectively. With respect to 3GPP TS 36.211 section 6.11, $N_{ID}^{(1)}=0$ can be mapped by the pair m0=0 and m1=1, which respectively define the particular first and second partial sequence. The identity group identifier $N_{ID}^{(1)}=30$ can be mapped by the first and the second partial sequences corresponding to m0=0 and m1=2. Note that m0 is identical for $N_{ID}^{(1)}=0$ and for $N_{ID}^{(1)}$ d=30, whereas m1 differs for the respective cell identity groups.

For $N_{ID}^{(1)}=30$ a second partial correlation on the basis of the partial sequence corresponding to the index m1=1 and partial sequence corresponding to m1=2 can be predicted to be almost zero, whereas a partial correlation based on a partial sequence corresponding to index m1=1 and another partial sequence corresponding to m1=1 is predicted to give a correlation peak. The correlation of two partial sequences corresponding to an identical index m0 (or, alternatively, m1) is expected to give a correlation peak, whereas the correlation of two partial sequences corresponding to a different index m0 (or alternatively m1) is expected to be about zero.

This knowledge permits to set one of the thresholds $C_{th,1}$ and $C_{th,2}$ higher than the other. Consequently, setting the threshold for the partial correlation which is known to be almost zero as the higher one would considerably lower the detection probability of phantom cells, while the increase of the probability to miss a valid cell remains negligible. If it is known a priori that a partial correlation is zero, it is made harder for the corresponding cell ID to survive due to noise. If it is a true cell, its detection is hardly impacted (however, the threshold should not be chosen unreasonably high).

The approach discussed above safely identifies correlation peaks from phantom cells in high SNR situations. In situations of a comparatively low SNR, phantom cells become less visible in case of noise-dependent threshold settings. Accordingly, the approach discussed herein can be implemented in all practical SNR scenarios. In high SNR regions the method will avoid phantom cells. Such phantom cells are more likely to happen at high SNR, when at high SNR a noise-dependent threshold will be low (and, hence, it might not avoid a phantom cell). In low SNR regions, when a noise-dependent threshold is high and the likelihood of a phantom cell decreases anyhow, the technique presented herein can even improve results also at this low SNR scenario.

The technique presented herein is not only capable of safely identifying phantom cells in single cell scenarios. In multi-cell scenarios in which the respective cells are aligned with respect to their frame timing (e.g., in TDD scenarios), there occur higher order phantom cells due to interference of the SSSs of two or more cells. For example, a cell with $N^{CELL}_{ID}=0$ overlaying a cell with $N^{CELL}_{ID}=144$ results in a phantom cell $N^{CELL}_{ID}=498$. The technique described herein can be adapted to be also capable of identifying such higher order phantom cells. However, such scenarios are very limited and therefore unlikely to happen at all. If they would appear, e.g. due to bad cell planning, those phantom cells will appear on the candidate list and could finally be sorted out, for example by an RSRP measurement. Due to the low probability of occurrence, this processing shall not cause any relevant overhead.

As has become apparent from the above description of exemplary embodiments, the present technique permits, inter alia, to prevent systematic false detections that arise when searching for cells the synchronization signals of which are received at approximately the same time (and, optionally, at different strengths). While the present technique can be implemented in single cell scenarios and asynchronous modes of operation, it is particularly useful in case of multiple cells exhibiting overlapping SSSs (e.g., in TDD and synchronous FDD E-UTRA networks). In each case, cell search time will be reduced since fewer attempts have to be carried out to find a particular cell. Additionally, processing power, which is a scarce resource in battery operated devices such as mobile terminals, can be saved. Processing power savings result in particular from the decreased risk of initiating RSRP measurements for validation of phantom cells.

The technique presented herein is robust in both low and high SNR scenarios and easy to implement. Additionally, it can easily be extended to combat higher order phantom cells in multi-cell scenarios.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous. Because the technique presented herein can be varied in many ways, it will be recognized that the invention should be limited only by the scope of the claims that follow.

The invention claimed is:

1. A method of determining a cell signature in a cellular communication network, the method comprising:
    providing a set of cell signature hypotheses, each cell signature hypothesis including a first partial hypothesis and a second partial hypothesis;
    receiving a signal carrying a cell signature, the signal including a first partial signal and a second partial signal;
    correlating the first partial signal with each first partial hypothesis to determine a first correlation result for each cell signature hypothesis;
    correlating the second partial signal with each second partial hypothesis to determine a second correlation result for each cell signature hypothesis;
    determining the cell signature based on the correlation results, the determining the cell signature including discarding a given cell signature hypothesis based on an analysis of a first magnitude of the first correlation result associated with the given cell signature hypothesis and a second magnitude of the second correlation result associated with the given cell signature hypothesis.

2. The method of claim 1, wherein the determining the cell signature comprises discarding the given cell signature in response to the first magnitude substantially differing from the second magnitude, which indicates that an undesired correlation artefact has been introduced.

3. The method of claim 1, wherein the determining the cell signature comprises analysing at least one of a difference and ratio between the first magnitude and the second magnitude.

4. The method of claim 1:
    wherein a third magnitude is a sum of the first magnitude and the second magnitude;
    wherein the determining the cell signature comprises:
        subjecting at least one of the first magnitude, the second magnitude, and the third magnitude to a threshold decision; or
        subjecting one or more parameters derived from one or more of the first magnitude, the second magnitude, and the third magnitude to a threshold decision.

5. The method of claim 4, further comprising discarding the given cell signature hypothesis if at least one of the first magnitude, the second magnitude, and the third magnitude is below an associated threshold.

6. The method of claim 5 wherein the associated threshold is set relative to a noise level of a transmission channel for the received signal.

7. The method of claim 4:
    wherein the determining the cell signature further comprises analysing at least one of a difference and ratio between the first magnitude and the second magnitude;
    further comprising discarding the given cell signature hypothesis if the third magnitude is above a first threshold and a fourth magnitude is above a second threshold, the fourth magnitude being a difference between the first magnitude and the second magnitude.

8. The method of claim 7, wherein the determining the cell signature comprises:
determining a set of one or more cell signature candidates based on cell signature hypotheses for which the third magnitude is above the first threshold;
discarding the cell signature candidates for which the fourth magnitude is above the second threshold.

9. The method of claim 4 wherein the determining the cell signature further comprises:
analysing at least one of a difference and ratio between the first magnitude and the second magnitude;
discarding the given cell signature hypothesis if the ratio between the first magnitude and the second magnitude is above a third threshold or below a fourth threshold.

10. The method of claim 1, wherein the first partial signal and the second partial signal are orthogonal to each other.

11. The method of claim 10:
wherein the first partial signal is transmitted on a first set of sub-carriers;
wherein the second partial signal is transmitted on a second set of sub-carriers disjunctive from the first set of sub-carriers.

12. The method of claim 1, wherein the first partial hypothesis relates to even numbered signature elements and the second partial hypothesis relates to odd numbered signature elements.

13. The method of claim 1:
wherein the received signal is a secondary synchronization signal carrying a cell-identity group identifier scrambled with a cell-identity identifier;
wherein the cell-identity identifier has been determined earlier based on a previously received primary synchronization signal;
wherein the cell signature hypotheses relate to hypotheses regarding the cell-identity group identifier.

14. The method of claim 1:
wherein the cell signature hypotheses relate to at least one of a frame timing and a cyclic prefix configuration;
further comprising determining at least one of the frame timing and the cyclic prefix configuration concurrently with the cell signature.

15. A computer program product stored in a non-transitory computer readable medium for determining a cell signature in a cellular communication network, the computer program product comprising software instructions which, when run on one or more computing devices, causes the one or more computing devices to:
provide a set of cell signature hypotheses, each cell signature hypothesis including a first partial hypothesis and a second partial hypothesis;
receive a signal carrying a cell signature, the signal including a first partial signal and a second partial signal;
correlate the first partial signal with each first partial hypothesis to determine a first correlation result for each cell signature hypothesis;
correlate the second partial signal with each second partial hypothesis to determine a second correlation result for each cell signature hypothesis;
determine the cell signature based on the correlation results, the determining the cell signature including discarding a given cell signature hypothesis based on an analysis of a first magnitude of the first correlation result associated with the given cell signature hypothesis and a second magnitude of the second correlation result associated with the given cell signature hypothesis.

16. An apparatus for determining a cell signature in a cellular communication network, the apparatus comprising:
memory configured to provide a set of cell signature hypotheses, each cell signature hypothesis including a first partial hypothesis and a second partial hypothesis;
an interface configured to receive a signal carrying a cell signature, the signal including a first partial signal and a second partial signal;
a correlator configured to:
correlate the first partial signal with each first partial hypothesis to determine a first correlation result for each cell signature hypothesis;
to correlate the second partial signal with each second partial hypothesis to determine a second correlation result for each cell signature hypothesis;
a processor configured to determine the cell signature based on the correlation results by discarding a given cell signature hypothesis based on an analysis of a first magnitude of the first correlation result associated with the given cell signature hypothesis and a second magnitude of the second correlation result associated with the given cell signature hypothesis.

17. The apparatus of claim 16, wherein the processor is configured to determine the cell signature by discarding the given cell signature in response to the first magnitude substantially differing from the second magnitude, which indicates that an undesired correlation artefact has been introduced.

18. A mobile terminal comprising a transceiver, the transceiver comprising:
memory configured to provide a set of cell signature hypotheses, each cell signature hypothesis including a first partial hypothesis and a second partial hypothesis;
an interface configured to receive a signal carrying a cell signature, the signal including a first partial signal and a second partial signal;
a correlator configured to:
correlate the first partial signal with each first partial hypothesis to determine a first correlation result for each cell signature hypothesis;
to correlate the second partial signal with each second partial hypothesis to determine a second correlation result for each cell signature hypothesis;
a processor configured to determine the cell signature based on the correlation results by discarding a given cell signature hypothesis based on an analysis of a first magnitude of the first correlation result associated with the given cell signature hypothesis and a second magnitude of the second correlation result associated with the given cell signature hypothesis.

19. The mobile terminal of claim 18, wherein the mobile terminal is 3GPP Long Term Evolution compatible.

* * * * *